G. W. YETTER.
NUT LOCK.
APPLICATION FILED MAY 6, 1916.
1,202,634.
Patented Oct. 24, 1916.
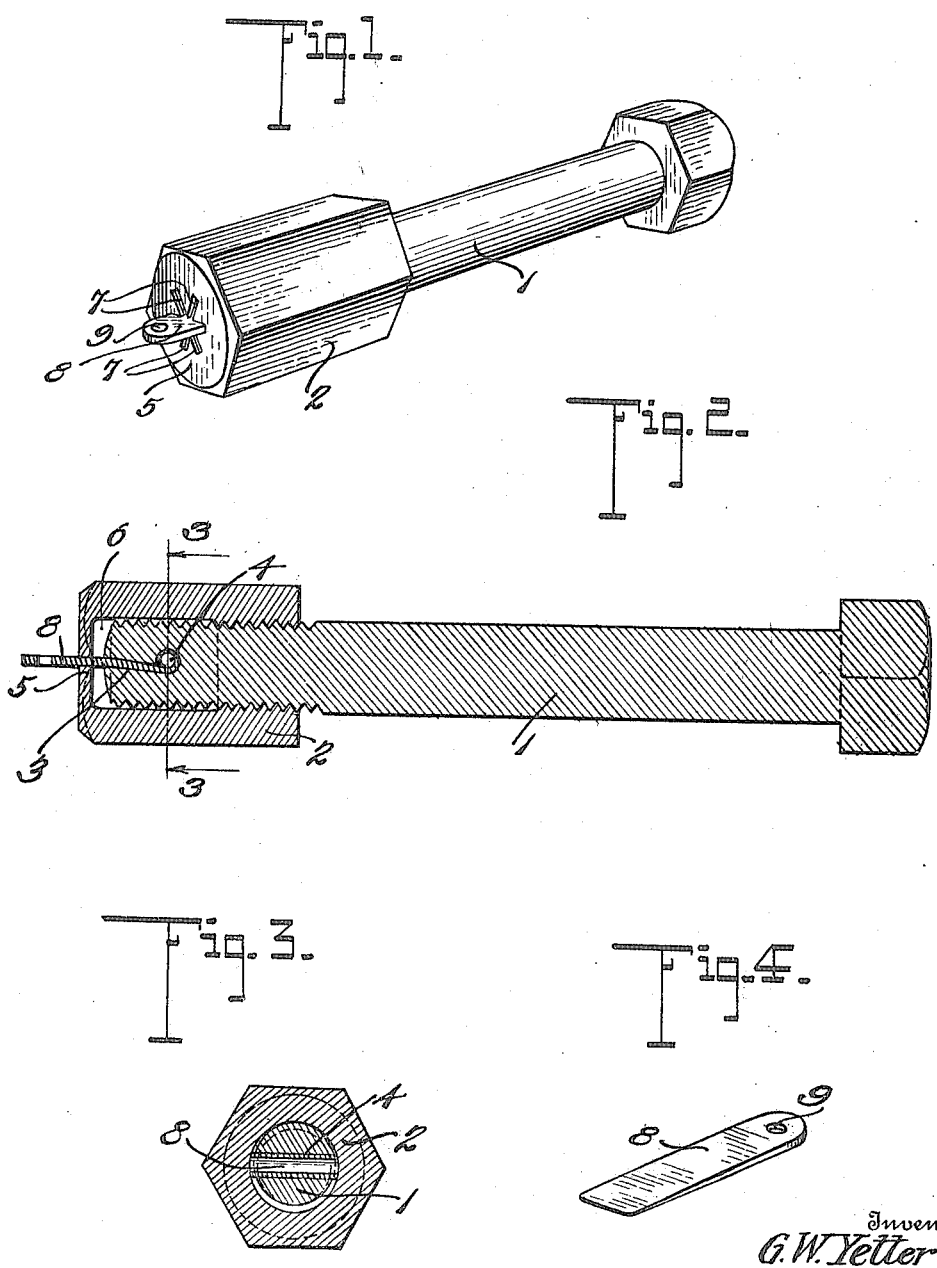

UNITED STATES PATENT OFFICE.

GEORGE W. YETTER, OF PENBROOK, PENNSYLVANIA.

NUT-LOCK.

1,202,634.  Specification of Letters Patent.  Patented Oct. 24, 1916.

Application filed May 6, 1916. Serial No. 95,860.

*To all whom it may concern:*

Be it known that I, GEORGE W. YETTER, a citizen of the United States, residing at Penbrook, in the county of Dauphin and State of Pennsylvania, have invented certain new and useful Improvements in Nut-Locks, of which the following is a specification.

This invention has relation to locking means for nuts of bolts and is designed for the usual purpose of preventing accidental or unauthorized displacement of a nut from a bolt to which it may be applied.

The invention involves the provision of a peculiarly formed nut constructed for coöperation with a key or locking member adapted to be interlocked with the bolt in such a manner as to be held against displacement, the said key or locking member being furthermore adapted to interlock with the nut whereby to prevent the unscrewing of the latter.

Among the objects of the invention are the provision of nut locking means of the class set forth wherein the action of the locking means is extremely effective for the desired purposes, and to devise a construction of parts whereby the locking of the nut is obtained, which construction is such as to very readily facilitate the assemblage of the several parts in proper coöperation to perform their locking functions.

With the foregoing and other objects in view having to do particularly with the detail construction of the locking means, a full understanding of the invention will be had upon reference to the aftergoing detail description in connection with the accompanying drawings, in which—

Figure 1 is a perspective view showing a bolt and nut applied thereto, the latter locked against displacement by means in accordance with the invention. Fig. 2 is a vertical longitudinal sectional view. Fig. 3 is a transverse sectional view taken about on the line 3—3 of Fig. 2. Fig. 4 is a detail perspective view of the locking key.

Referring to the drawings, 1 denotes a bolt comprising the customary head and having a suitable threaded end portion on which the nut 2 is adapted to be screwed. The said threaded end of the bolt is formed with a longitudinal slot 3 leading to a transverse opening 4 and merging into said opening substantially at a tangent to the latter.

The nut 2 is of special construction being provided interiorly with a threaded portion adapted to engage with the corresponding portion of the bolt 1, said threaded portion extending, however, only about one third of the length of the nut. The nut has an elongated formation and the exact length of the threaded interior portion of the same is not material to the invention and may be varied as deemed best in actual practice. The outer end of the nut is closed as seen at 5 by a comparatively thin web of the metal from which the nut is made, and there is formed between the outer end of the nut 2 and the threaded portion previously referred to a chamber or space 6. The closed portion 5 of the nut 2 is furthermore provided with a plurality of slots 7 intersecting one another about at a central point between the ends of the slots, whereby said various ends of the slots radiate from a common central point with reference to the axis of the nut.

For coöperation with the parts 1 and 2 there is provided a locking key 8 consisting preferably of a plate formed with an opening 9 in its outer end and tapering from said outer end to a thin edge at its opposite end whereby the latter end is rendered flexible. The key 8 is used to interlock the parts 1 and 2 in such a manner as to prevent unscrewing movement of the nut when once properly applied to the bolt 1.

The foregoing being substantially a full disclosure of the features of construction forming a part of the invention, the manner of operation of the locking means may now be set forth.

The bolt 1 is passed through the parts to be secured together in the customary manner and the nut 2 is screwed on the threaded end of the bolt in the usual way and by the employment of any suitable tool. The operator will take care in applying the nut 2 to the bolt 1 that one of the intersecting slots 7 at the outer end of the nut 2 shall be substantially alined with the slot 3 of the bolt, when the nut 2 is screwed home. This done, it is then possible to introduce the key 8 into the space or chamber 6 of the nut and into the slot 3 and by driving said key with a hammer or suitable tool the flexible end of the key will be bent into a roll by being deflected laterally and following the peripheral wall of the opening 4. In this manner the key 8 is interlocked with the bolt 1 and prevented from accidental displacement. Furthermore, as an incident to the above operation it will be apparent that the key 8 is interlocked with the outer closed end portion 5 of the nut 2 and so long as the key remains in place in the manner illustrated in the figures of the drawings the members 1 and 2 are effectively prevented from relative movement such as might result in the displacement of the nut.

Owing to the provision of the opening 9 at the outer extremity of the key 8 a convenient means is afforded for the engagement of a proper tool with the key and by the application of sufficient power the key 8 may be withdrawn so as to permit of removal of the nut 2 as soon as the interlocking relation of the key with respect to the bolt and nut, is discontinued.

Having thus described the invention, what is claimed is:—

In combination, a bolt having a threaded end portion formed with a longitudinal slot, said bolt also having transverse openings at the terminus of the slot, a nut formed at its inner end with a threaded portion adapted for screwing on the bolt and formed additionally with an outer closed end portion, said outer closed end portion being formed with a plurality of intersecting slots therethrough any one of which is adapted to be alined with the slot of the bolt, and a key entering one of the slots of the nut and the slot of the bolt and adapted to interlock in the transverse opening at the end of the longitudinal slot to thereby form locking means intermediate the bolt and nut preventing displacement of the latter from said bolt.

In testimony whereof I affix my signature.

GEORGE W. YETTER.

Copies of this patent may be obtained for five cents each, by addressing the "Commissioner of Patents, Washington, D. C."